United States Patent
White et al.

(10) Patent No.: US 7,474,254 B2
(45) Date of Patent: Jan. 6, 2009

(54) RADAR SYSTEM WITH AGILE BEAM STEERING DEFLECTOR

(75) Inventors: Walter J. White, Yorba Linda, CA (US); Daniel A. Lotocky, Fullerton, CA (US)

(73) Assignee: Innovonix, LLC., Yorba Linda, CA (US)

( * ) Notice: Subject to any disclaimer, the term of this patent is extended or adjusted under 35 U.S.C. 154(b) by 80 days.

(21) Appl. No.: 11/682,294

(22) Filed: Mar. 5, 2007

(65) Prior Publication Data
US 2008/0169963 A1    Jul. 17, 2008

Related U.S. Application Data

(60) Provisional application No. 60/885,126, filed on Jan. 16, 2007.

(51) Int. Cl.
  *G01S 13/00* (2006.01)
  *H01Q 19/10* (2006.01)
  *H01Q 3/12* (2006.01)
  *H01Q 13/00* (2006.01)

(52) U.S. Cl. .............................. 342/74; 342/75; 342/52; 342/58; 343/755; 343/761; 343/781 R

(58) Field of Classification Search ............... 342/26 R, 342/26 A, 26 B, 26 C, 26 D, 52, 53, 55, 58, 342/74, 75, 95–97, 176, 182; 343/753–755, 343/757, 761, 762–766, 772, 781, 909, 912, 343/781 R
See application file for complete search history.

(56) References Cited

U.S. PATENT DOCUMENTS

| | | | | |
|---|---|---|---|---|
| 2,645,769 A | * | 7/1953 | Roberts | 342/104 |
| 2,696,522 A | * | 12/1954 | Rines | 342/179 |
| 3,114,910 A | * | 12/1963 | Rymes | 342/169 |
| 3,793,637 A | * | 2/1974 | Meek | 343/761 |
| 3,924,235 A | * | 12/1975 | Heller et al. | 342/75 |

(Continued)

OTHER PUBLICATIONS

Waters, William M. Two Beam Scanning Antenna Requiring No Rotary Joints US Statutory Invention Registration H966 Sep. 3, 1991.

(Continued)

*Primary Examiner*—Thomas H Tarcza
*Assistant Examiner*—Peter M Bythrow
(74) *Attorney, Agent, or Firm*—Fountain Law Group, Inc.; George L. Fountain

(57) ABSTRACT

A radar system including a base unit and a radar sensor. The sensor steers a beam in a scanning or tracking manner in both azimuth and elevation. Steering control in azimuth and elevation may be achieved based on configuration settings in the radar sensor processor. The pan-tilt setting may be configured remotely at the base unit. The sensor may include a camera to take panoramic images of the terrain surrounding the sensor, as well as objects-of-interest detected by the system. The sensor is able to transmit radar return information and camera images to the base unit. The base unit is able to display panoramic images and superimpose graphics illustrating a scan profile of the sensor in relationship to the surroundings. The beam steering profile can be controlled by graphically manipulating the profile on the display. This allows configuration of the scanning or tracking profile based on the sensor surroundings.

12 Claims, 12 Drawing Sheets

U.S. PATENT DOCUMENTS

| | | | | |
|---|---|---|---|---|
| 3,949,404 | A * | 4/1976 | Fletcher et al. | 343/761 |
| 4,062,018 | A * | 12/1977 | Yokoi et al. | 343/754 |
| 4,070,678 | A * | 1/1978 | Smedes | 343/754 |
| 4,298,280 | A * | 11/1981 | Harney | 356/5.06 |
| 4,312,002 | A * | 1/1982 | Stewart | 343/725 |
| 4,333,077 | A * | 6/1982 | Teilhet | 342/52 |
| 4,780,719 | A * | 10/1988 | Frei et al. | 342/53 |
| 4,873,481 | A * | 10/1989 | Nelson et al. | 324/640 |
| 5,373,318 | A * | 12/1994 | Harriman | 348/117 |
| 5,392,048 | A * | 2/1995 | Michie | 342/26 D |
| 6,321,106 | B1 * | 11/2001 | Lemelson | 600/407 |
| 6,437,727 | B2 * | 8/2002 | Lemelson et al. | 342/45 |
| 6,556,174 | B1 * | 4/2003 | Hamman et al. | 343/755 |
| 6,657,589 | B2 * | 12/2003 | Wang et al. | 342/383 |
| 6,859,183 | B2 * | 2/2005 | Carter et al. | 343/754 |
| 6,950,061 | B2 * | 9/2005 | Howell et al. | 342/359 |

OTHER PUBLICATIONS

Brooker, Graham M. Development and Application of Millimeter Wave Radar Sensors for Underground Mining IEEE Sensors Journal, vol. 5, No. 6, Dec. 2005.

Brooker, Graham M. Millimetre Waves for Robotics. Proc 2001. Australian Conference on Robotics and Automation, Sydney Nov. 14-15, 2001.

* cited by examiner

RADAR SYSTEM WITH AGILE BEAM STEERING DEFLECTOR

CROSS REFERENCE TO A RELATED APPLICATION

This application claims priority to U.S. Provisional Application, Ser. No. 60/885,126, filed on Jan. 16, 2007, and entitled "Independent Elevation and Azimuth Control Radar Detection System and Related Method," which is herein incorporated by reference.

FIELD OF THE INVENTION

This invention relates generally to radar systems, and in particular, to a radar detection system capable of independently controlling the elevation and azimuth of a scanning radar beam. In particular, a radar detection system capable of continually rotating a radar beam about a vertical axis for azimuth scan control, while interdependently controlling the radar beam's elevation or pitch, without the need for the radar transceiver to rotate or pitch with the moving radar beam.

BACKGROUND OF THE INVENTION

Radar detection systems are used in many applications. For example, radar detection systems are used to detect objects in the air, such as airplanes, helicopters, and other aircrafts. Similarly, radar detection systems are also used for detecting objects on the ground. For example, ground detection radar systems are sometimes used in security applications to alert for the presence of intruders, unfriendly combatants, and other unwanted parties and/or objects.

In the past, radar detection systems have been able to perform a continuous 360 degree azimuth scan of their proximate area to a limited range. However, such radar systems are capable of performing the azimuth scan only at a fixed elevation. Based on the surrounding terrain, scanning at a fixed elevation may not provide the desired coverage for that particular area. This is better explained with reference to the following example.

FIG. 1A illustrates a diagram of an exemplary radar coverage map view. In this example, a conventional radar system 100 is deployed in an area that has significant topographical variations. For example, an area of high elevation exists at azimuth angles of approximately 170 to 260 degrees relatively to the radar detection system 100. There is also an area of low elevation at azimuth angles of approximately 280 to 360 degrees relative to the radar detection system 100. The remaining area between azimuth angles 360 to 170 degrees has an elevation that varies by only a few degrees, and is generally an even-level area.

FIG. 1B illustrates a diagram of an exemplary radar coverage panoramic view of the conventional radar system 100. The panoramic view illustrates the high elevation area between azimuth angles 170 to 260 degrees, the low elevation area between azimuth angles 280 and 360 degrees, and the generally flat area between 360 and 170 degrees. As previously discussed, the conventional radar detection system 100 performs a scan at a constant elevation. The elevation is typically manually set during the deployment of the system 100. In this example, the panoramic view shows examples of three (3) constant elevation scans, Levels 1-3, that the conventional radar detection system 100 may be manually set to perform.

There are substantial drawbacks with the conventional radar detection system 100. For example, if the radar detection system 100 is manually set to scan along the higher Level 1 elevation, there may be objects-of-interest that are located at lower altitudes or on the ground that the system 100 may not be able to detect due to the radar beam passing above such objects-of-interest. If, on the other hand, the radar detection system 100 is manually set to scan along the medium-height Level 2 elevation, there may be objects-of-interest that are located above and below the scanning elevation that may not be detected, again because the objects-of-interest are not illuminated by the radar beam. Similarly, if the radar detection system 100 is manually set to scan along the lower Level 3, there may be objects-of-interest that are located at higher altitudes that the system 100 that may not be able to detect.

Thus, there is a need for an improved radar detection system.

DETAILED DESCRIPTION OF THE EXEMPLARY EMBODIMENTS

Figure 2:
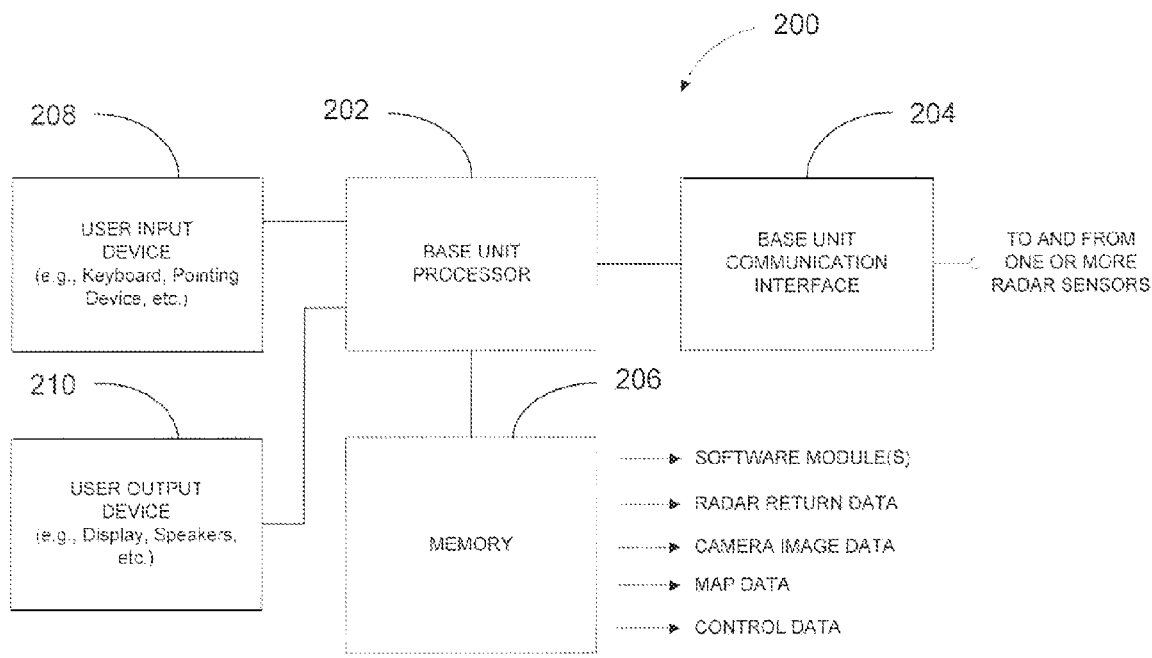
FIG. 2 illustrates a block diagram of an exemplary base unit of a radar detection system in accordance with an embodiment of the invention.

FIG. 2 illustrates a block diagram of an exemplary base unit 200 of a radar detection system in accordance with an embodiment of the invention. As discussed in more detail below, the base unit 200 allows a user to set up the scanning profile of one or more radar sensors that may have been strategically deployed to secure a particular area. The base unit 200 also receives radar return information from the one or more radar sensors in order to detect targets-of-interest in the particular area.

The base unit 200 also receives image information from one or more camera units respectively in the one or more radar sensors for assisting a user to configure the scanning profiles of the respective one or more radar sensors, and to view the detected targets-of-interest in the particular area. The base unit 200 also provides a graphical unit interface (GUI) that provides a map view of the radar coverage area, topographical information, and target information. The GUI also displays a panoramic image view from the camera of a radar sensor, simultaneously with one or more respective radar scan lines to assist a user in configuring the scanning profile in view of the surrounding terrain. These and other features of the base unit 200 are further discussed in more detail below.

In particular, the base unit 200 comprises a base unit processor 202, a communication interface 204, a memory 206, a user input device 208, and a user output device 210. The processor 202, under the control of one or more software module(s), performs the various operations of the base unit 200. For instance, the processor 202 configures the scanning profile of a radar sensor in response to user inputs received from the user input device 208. The processor 202 also receives and processes radar return information from a radar sensor. The processor 202 also receives and processes image information received from a camera of a radar sensor. The processor 202 also provides graphical information, such as the radar return information, target information, camera image data, map data, and user control interface to the user output device 210 for viewing and interacting by a user. It shall be understood that the processor 202 may comprise multiple processing units to achieve the operations in a multi-task fashion.

The communication interface 204 allows the processor 202 to communicate with one or more radar sensors via a wired medium, a fiber optic medium, and/or a wireless medium. The memory 206 may be one or more computer readable mediums, such as RAM, ROM, magnetic hard disk, optical disc, etc., that stores one or more software module(s) that control the processor 202 to perform its various operations. The memory 206 may further store radar return data such as terrain and target information, camera image data, map data, control data such as the scanning profiles, target detection history, and other information. The user input device 208 may be any device that allows a user to send information to the processor 202, such as a keyboard, pointing device, touch-sensitive display, etc. The user output device 210 may be any device that receives information from the processor 202 for communication to a user, such as a display, speaker, etc.

Figure 3:
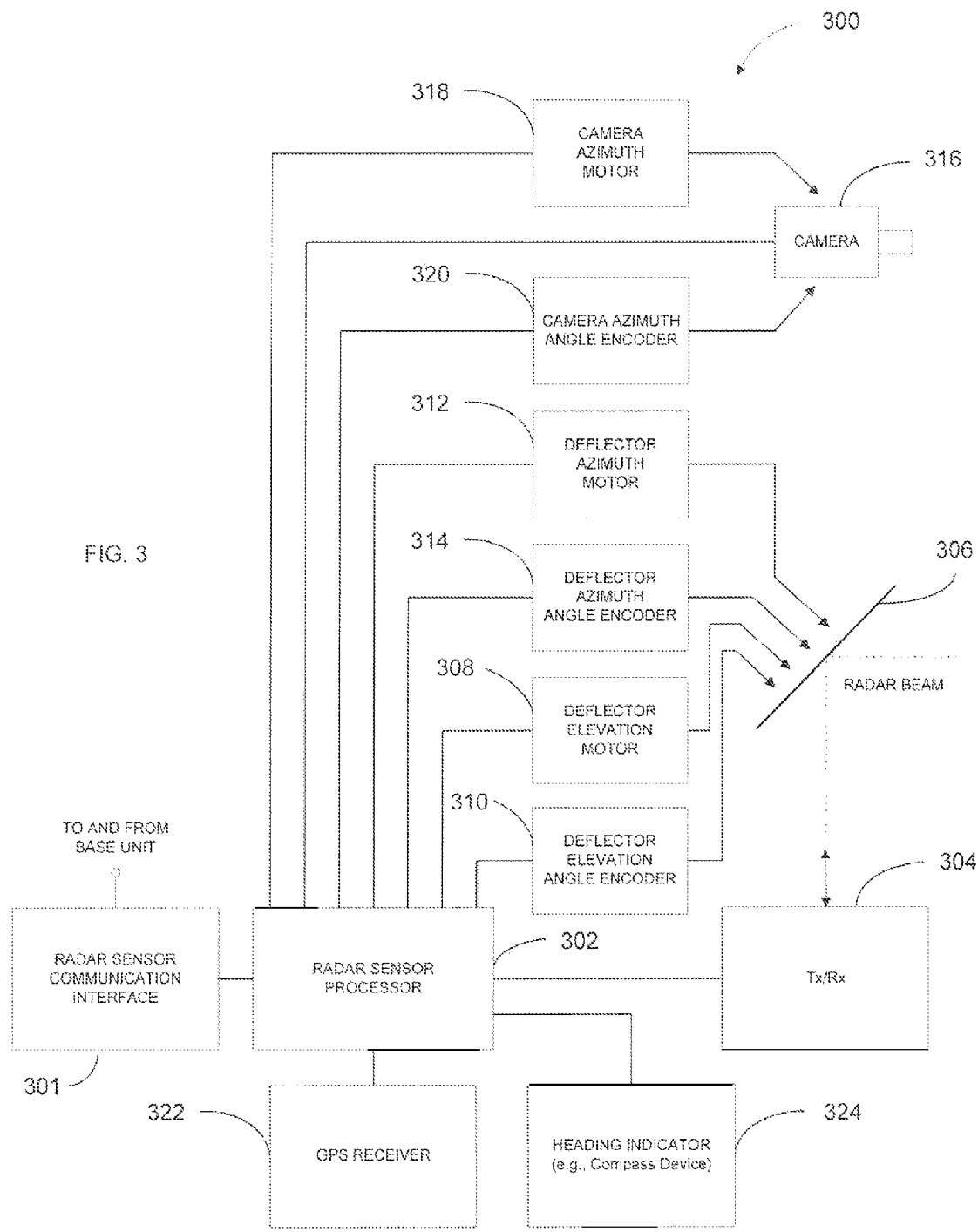
FIG. 3 illustrates a block diagram of an exemplary radar sensor of an exemplary radar detection system in accordance with another embodiment of the invention.

FIG. 3 illustrates a block diagram of an exemplary radar sensor 300 of an exemplary radar detection system in accordance with another embodiment of the invention. As discussed in more detail below, the radar sensor 300 transmits a radar beam via a deflector that independently rotates and pitches to change the azimuth and elevation directions of the radar beam. The radar sensor 300 also receives radar returns via the deflector, processes the radar returns in a radar sensor processor, and transmits the processed information to the base unit 200 for further processing and/or display.

The radar sensor 300 receives control information from the base unit 200 to control the rotation and pitch of the deflector to achieve a desired scanning profile. The radar sensor 300 uses angle encoders to sense position of the rotating and pitching of the deflector to provide azimuth and elevation feedback information to the radar sensor processor. The position of the rotating and pitching deflector can be transmitted to the base unit 200 to provide real time information at the base unit 200 as to the direction of the radar beam.

Optionally, the radar sensor 300 may include a camera rotatable along the azimuth to provide images of the surrounding terrain to a user at the base unit 200. As explained in more detail below, this assists a user at the base unit 200 to configure the scanning profile for the radar sensor 300 based on the surrounding terrain. Additionally, if a target-of-interest has been detected by the radar sensor by processing the radar return information, the camera may be used to provide images of the target to the base unit 200. The radar sensor 300 may receive control information from the base unit 200 for controlling the azimuth orientation of the camera. Additionally, the camera may be oriented automatically by the radar sensor processor, based on modes of operation and target detection events. The radar sensor 300 also senses the angular orientation of the camera to provide orientation control and information of the viewing angle of the camera to the radar sensor processor and base unit 200.

Also optionally, the radar sensor 300 may include a global positioning system (GPS) receiver to determine its geographical location information and precise time information, and provide it to the base unit 200. The base unit 200 uses the geographical location information to denote the location of the radar sensor 300 on a map displayed by the user output device 210. Also, the radar sensor 300 includes a heading or direction indicator, such as a compass-based device, to determine its orientation with respect to the Earth. This information is sent to the base unit 200 which will use it to display each radar sensor azimuth orientation with respect to the Earth's coordinate system. The base unit 200 uses this information to display on its map view, target information and other radar return information coincident with the heading to which the radar scanning beam is oriented to the Earth.

More specifically, the radar sensor 300 comprises a radar sensor communication interface 301, a radar sensor processor 302, a radar transceiver (Tx/Rx) 304, a deflector 306, a deflector elevation motor 308, a deflector elevation angle encoder 310, a deflector azimuth motor 312, and a deflector azimuth angle encoder 314. The radar sensor 300 may further include a camera 316, a camera azimuth motor 318, and a camera azimuth angle encoder 320. Additionally, the radar sensor 300 may include a GPS receiver 322 and a heading indicator 324.

The communication interface 301 facilitate the communication of information between the radar sensor processor 302 of the radar sensor 300 and the base unit 200. The radar sensor processor 302 controls the various elements of the radar sensor 300 via instructions received from the base unit 200 via the communication interface 301. Under the general control of the base unit 200 via the communication interface 301, the radar sensor processor 302 controls the transceiver (Tx/Rx) to transmit a radar beam and receive radar returns for radar signal processing. The processed radar information is transmitted to the base unit 200 via the communication interface 301. The deflector 306 directs the radar beam in a particular azimuth and elevation direction, and directs radar returns to the transceiver (Tx/Rx) 304. The transceiver (Tx/Rx) 304 may transmit via frequency modulated continuous wave (FMCW), frequency stepping, maintain a constant frequency to obtain Doppler information, or use other radar modulation techniques. The radar sensor processor may use Fast Fourier Transform (FFT) to analyze returns in the frequency domain, and Constant False Alarm Rate (CFAR) techniques to establish thresholds for each sector-elevation position being monitored by the radar sensor 300.

Under the general control of the base unit 200 via the communication interface 301 and direct control of the radar sensor processor 302, the deflector elevation motor 308 changes the elevation (pitch) orientation of the deflector 306 to change the elevation angle of the radar beam. The deflector elevation angle encoder 310 senses the elevation orientation of the deflector 306, and provides this information to the radar sensor processor 302 for subsequent transmission to the base unit 200 via the communication interface 301. Under the general control of the base unit 200 via the communication interface 301 and direct control of the radar sensor processor 302, the deflector azimuth motor 312 changes the azimuth orientation of the deflector 306 to change the azimuth angle of the radar beam. The deflector azimuth angle encoder 314 senses the azimuth orientation of the deflector 306, and provides this information to the radar sensor processor 302 for subsequent transmission to the base unit 200 via the communication interface 301.

Under the general control of the base unit 200 via the communication interface 301 and direct control of the radar sensor processor 302, the camera 316 provides image information of the surrounding terrain to the base unit 200 via the radar sensor processor 302 and communication interface 301. The camera 316 may be a still camera, or a video camera, and may view the terrain using infrared, near infrared or visible light, or may be another type of image capturing device. Under the general control of the base unit 200 via the communication interface 301 and direct control of the radar sensor processor 302, the camera azimuth motor 318 changes the azimuth orientation of the camera 316. The camera azimuth angle encoder 320 senses the azimuth orientation of the camera 316, and provides this information to the radar sensor processor 302 for subsequent transmission to the base unit 200 via the communication interface 301. Although not shown, the radar sensor 300 may also include a motor and encoder for controlling the elevation orientation of the camera 316.

Under the general control of the base unit 200 via the communication interface 301 and direct control of the radar sensor processor 302, the GPS receiver 322 provides information as to the geographical location of the radar sensor 300 to the base unit 200 via the radar sensor processor 302 and communication interface 301. Additionally, the GPS receiver 322 provides accurate time information to the radar sensor processor 302 which is used for time correlation of events being monitored by the radar sensor 300. Under the general control of the base unit 200 via the communication interface 301 and direct control of the radar sensor processor 302, the heading or direction indicator 324 provides information as to the orientation of the radar sensor 300 with respect to the Earth's coordinate system to the base unit 200 via the radar sensor processor 302 and communication interface 301.

Figure 1A:
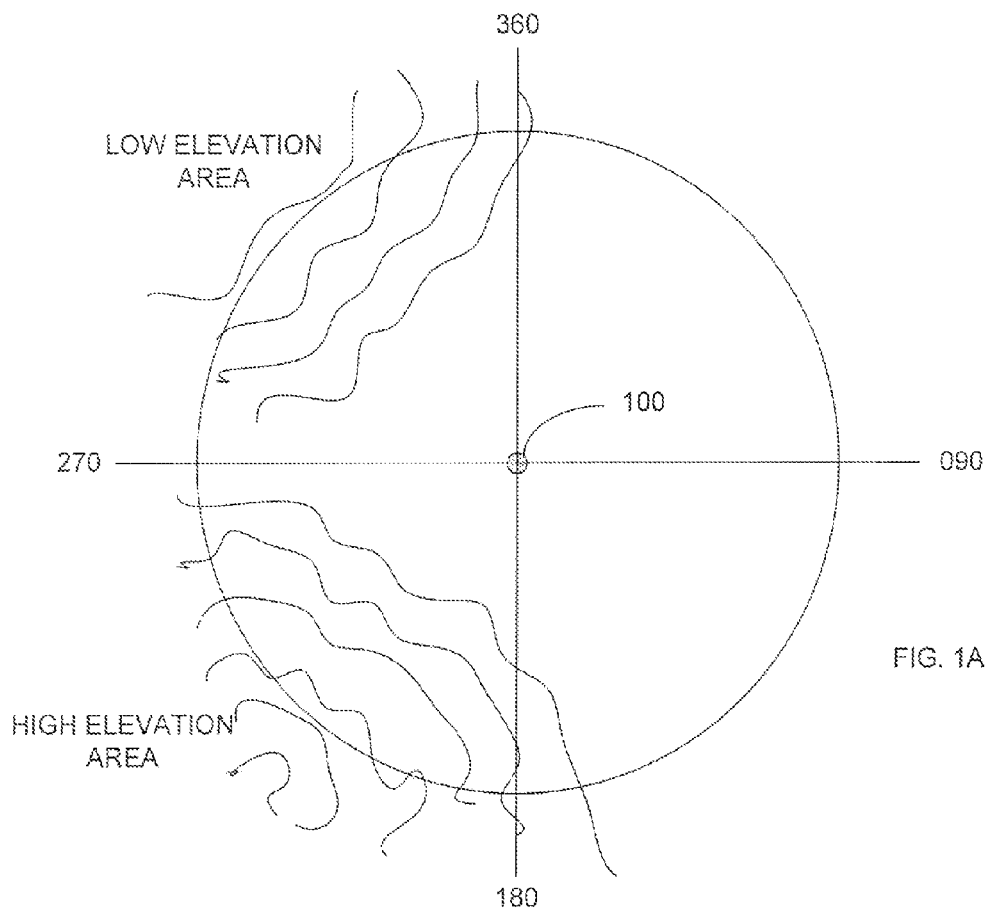
FIG. 1A illustrates a diagram of an exemplary radar coverage map view of a conventional radar detection system.
Figure 1B:
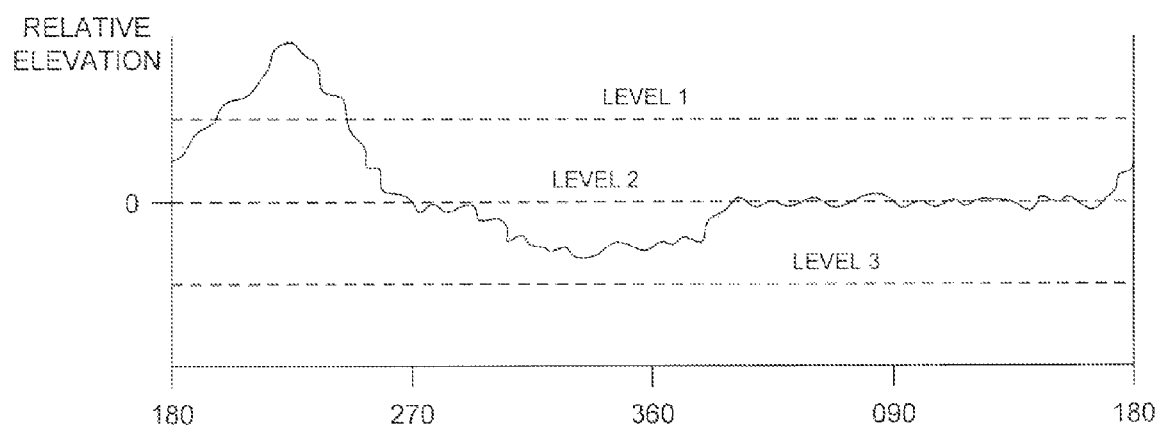
FIG. 1B illustrates a diagram of an exemplary radar coverage panoramic view of a conventional radar detection system.
Figure 4A:
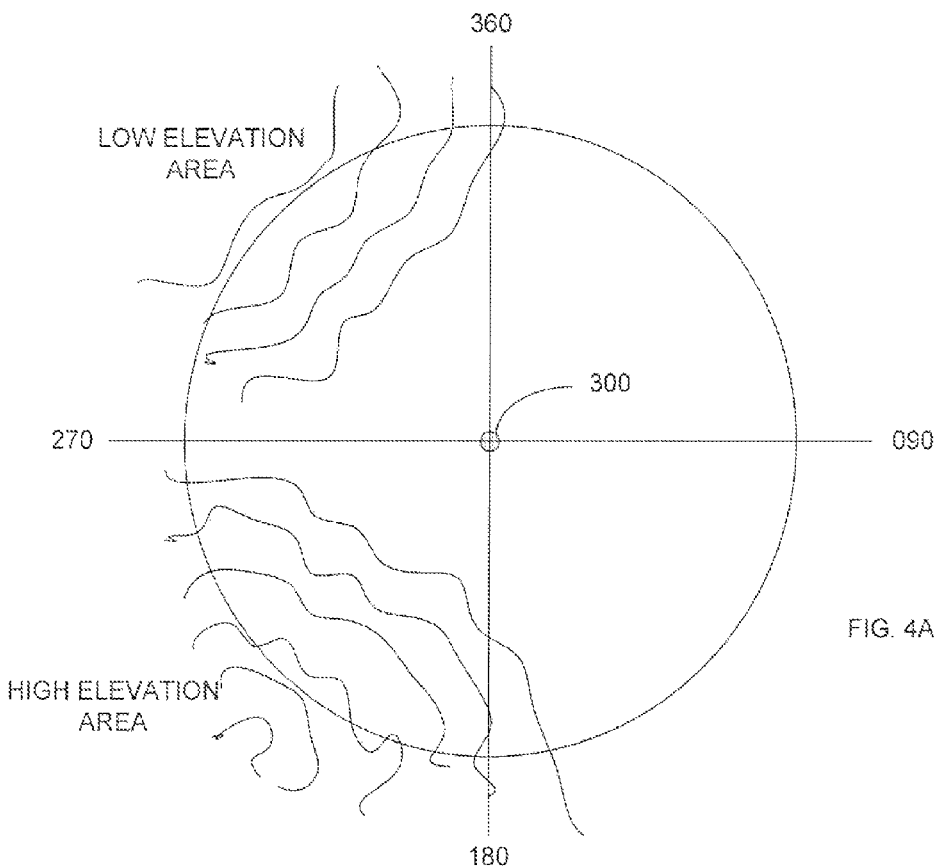
FIG. 4A illustrates a diagram of an exemplary radar coverage map view of an exemplary radar detection system in accordance with another embodiment of the invention.

FIG. 4A illustrates a diagram of an exemplary radar coverage map view of the radar detection system in accordance with another embodiment of the invention. Similar to the radar coverage map view depicted in FIG. 1A, the radar sensor 300 has been deployed in a region that has an area of high elevation at azimuth angles of approximately 170 to 260 degrees relative to the radar sensor 300, an area of low elevation at azimuth angles of approximately 280 to 360 degrees relative to the radar sensor 300, and a generally flat area at azimuth angles of approximately 360 to about 170 degrees.

Figure 4B:
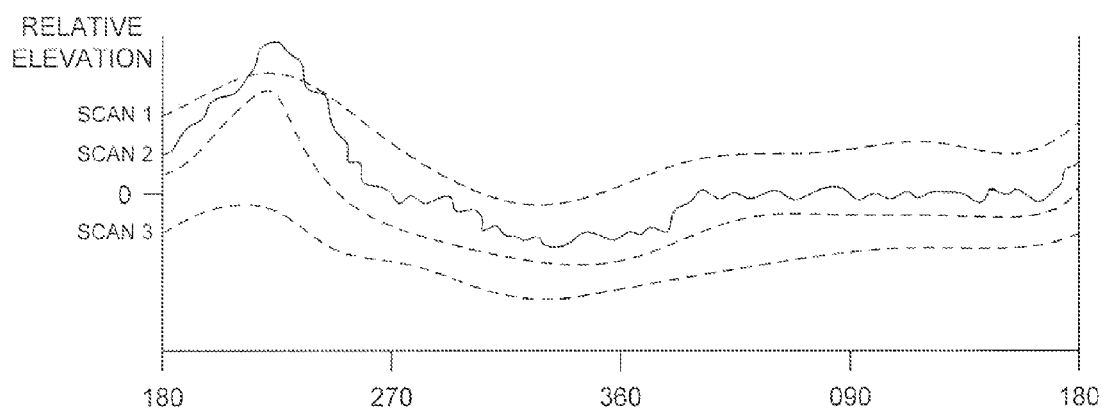
FIG. 4B illustrates a diagram of an exemplary radar coverage panoramic view of an exemplary radar detection system in accordance with another embodiment of the invention.

FIG. 4B illustrates a diagram of an exemplary radar coverage panoramic view of the exemplary radar detection system in accordance with another embodiment of the invention. The panoramic view illustrates the high elevation area between azimuth angles 170 to 260 degrees, the low elevation area between azimuth angles 280 and 360 degrees, and the generally flat area between 360 and 170 degrees. In this example, however, the radar sensor 300 is able to change the elevation of the scan under the general control of the base unit 200 and the direct control of the radar sensor processor 302 to provide more effective security coverage of the area.

For example, the base unit 200 may send control information to the radar sensor 300 to provide a scan profile Scan 1 that is used by the radar sensor processor 302 to tilt the beam to track the elevation as depicted in FIG. 4B. The Scan 1 profile may be useful in detecting airborne and/or high altitude ground targets. As another example, the base unit 200 may send control information to the radar sensor 300 to provide a scan profile Scan 2 that is used by the radar sensor processor 302 to tilt the beam to track the elevation as depicted in FIG. 4B. The Scan 2 profile may be useful in detecting more distant ground targets and/or targets located at high relative altitudes. As yet another example, the base unit 200 may send control information to the radar sensor 300 to provide a scan profile Scan 3 that is used by the radar sensor processor 302 to tilt the beam to track the elevation as depicted in FIG. 4B. The Scan 3 profile may be useful in detecting closer targets on the ground.

Figure 4C:
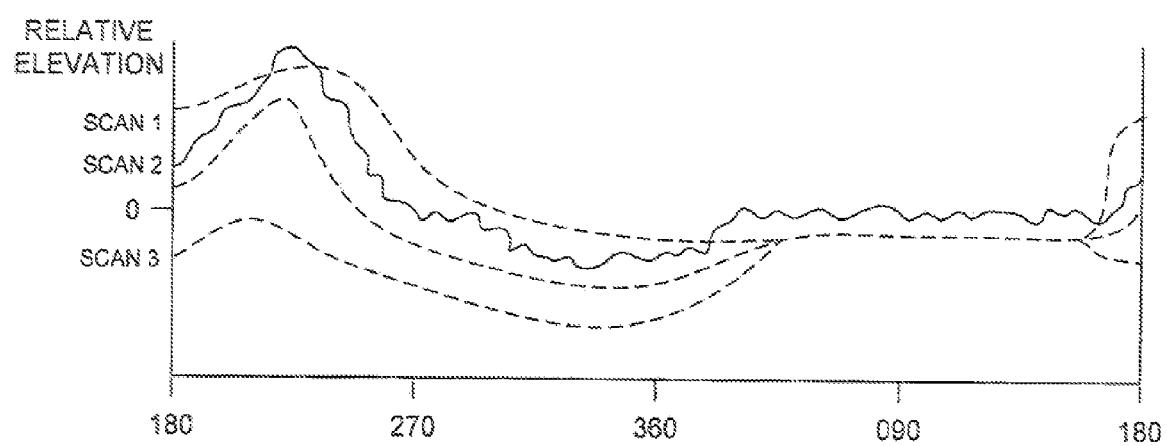
FIG. 4C illustrates a diagram of an exemplary radar coverage panoramic of an exemplary radar detection system where multiple scan paths diverge in elevation to enable coverage over a range of terrain altitudes in accordance with another embodiment of the invention.

The base unit 200 may further send control information to the radar sensor 300 to vary the scanning profile on a scan-to-scan basis. For example, the base unit 200 may send control information to the radar sensor 300 to cycle through the profile Scans 1-3 on a per scan basis. Or, the base unit 200 may send control information to the radar sensor 300 to repeat the following scan profile pattern: 2-2-1-2-2-3-2-2. Further, the base unit 200 may send scan profile information where two or more scan paths converge to a single scan path over a given azimuth angle scan range, such as the generally flat area between 360 and 170 degrees as shown in FIG. 4C. The base unit 200 may further send control information to the radar sensor 300 to control the speed of the deflector azimuth motor 312 so that a desired scanning resolution can be achieved.

Figure 5:
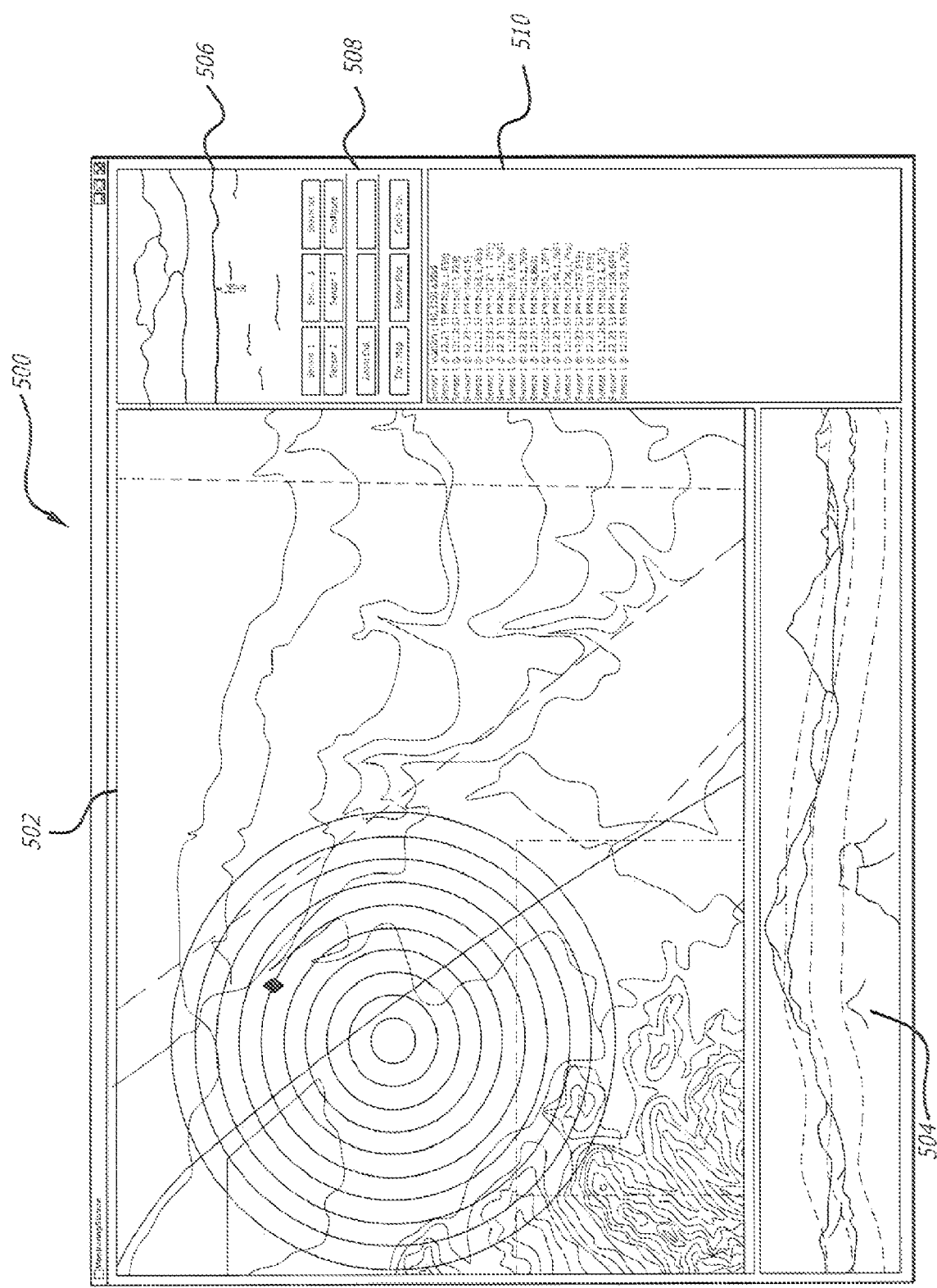
FIG. 5 illustrates a diagram of a graphical unit interface (GUI) of the radar detection system in accordance with another embodiment of the invention.

FIG. 5 illustrates a diagram of an exemplary screen shot 500 provided by the graphical unit interface (GUI) display 210 of the base unit 200 of the radar detection system in accordance with another embodiment of the invention. The screen shot 500 includes a map view portion 502, a panoramic view portion 504, a camera view portion 506, a control interface portion 508, and a target tracking log display portion 510. The map portion 502 may depict a topographical map including concentric circles illustrating the coverage area of a deployed radar sensor. The map portion 502 may also include a graphical representation (e.g., red radar blips or symbol) of detected targets located within the coverage area of the radar sensor.

The panoramic view portion 504 provides a panoramic image of the terrain surrounding the radar sensor 300 as captured by the camera 316. As shown, the panoramic view portion 504 include dashed lines representing scanning profiles for the radar sensor 300. A user using the user input device 208, such as a pointing device (e.g., a mouse or tracking ball), may graphically alter the scanning profile lines in the panoramic view portion 504. In response, the processor 202 sends control information to the radar sensor to produce scanning profiles in accordance with their graphical representation in the panoramic view portion 504.

The camera view portion 506 provides an image of a detected target. As previously discussed, the image could be a still image, a video, an infrared image, or others. The target tracking portion 510 provides information as to the location of detected targets and their associated detection times.

The control interface portion 508 allows the user to configure, command, and control each of the radar sensors to adjust sensitivity parameters, configuration parameters, and operating parameters for the radar portion and the camera portion of the radar sensor 300. Also, the control interface portion 508 includes adjustment controls for the GUI display, including selecting the background image/map, and zoom in/out control of the map display. Additionally, the control interface portion 508 includes controls for configuring the log file settings so that log records from the radar sensors can be stored for later analysis of an intrusion. Another control operation may be the ability for the user to mask detection areas of each sensor on the map view portion 502 with a line-draw-fill tool such that some area(s) within the radar sensors' range will be configured as non-detect areas. Similarly, as discussed above, the user can use a line-draw tool to draw on the panoramic image view 504 to define the radar sensors' scan profile. Other user controls and configuration features may be provided in the control interface portion 508.

Figure 6A:
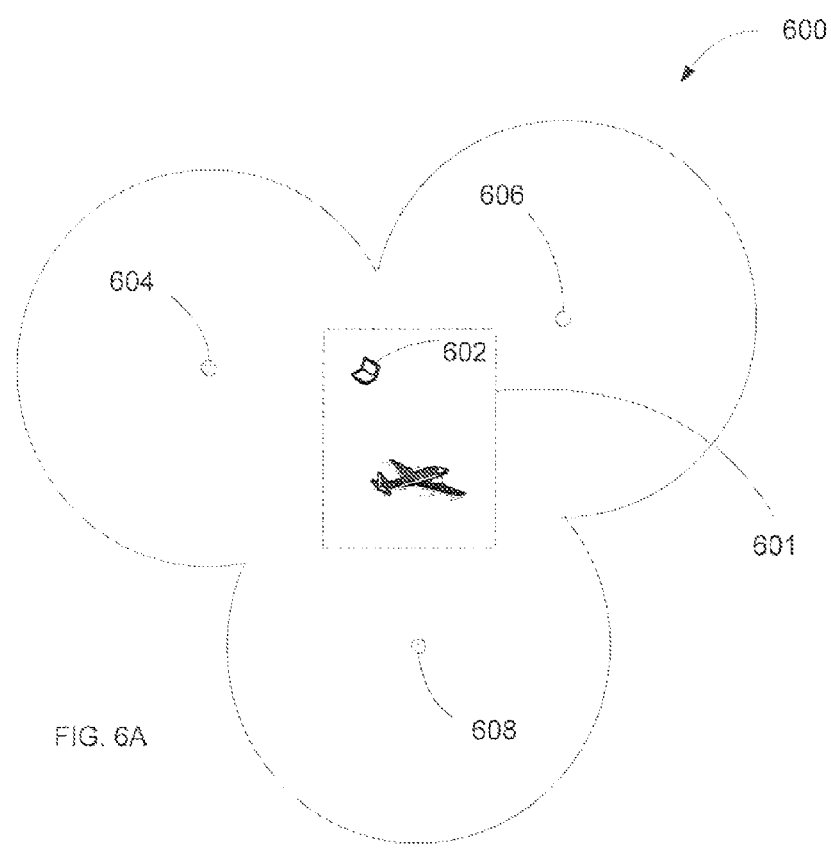
FIG. 6A illustrates a diagram of an exemplary radar detection system used in a security application in accordance with another embodiment of the invention.

FIG. 6A illustrates a diagram of an exemplary radar detection system 600 in a security application in accordance with another embodiment of the invention. The radar detection system 600 may be deployed to set up a perimeter around an encampment 601. In particular, the radar detection system 600 comprises a base unit 602, such as the base unit 200 previously described. The base unit 602 may be situated at or near the encampment 601. The radar detection system 600 further comprises a plurality of radar sensors 604, 606, and 608, such as the radar sensors 300 previously described. The radar sensors 604, 606, and 608 are communicatively coupled to the base unit 602 via a wireless or wired medium. The radar sensors 604, 606, and 608 may be strategically placed to set up a security perimeter around an encampment 601.

Figure 6B:
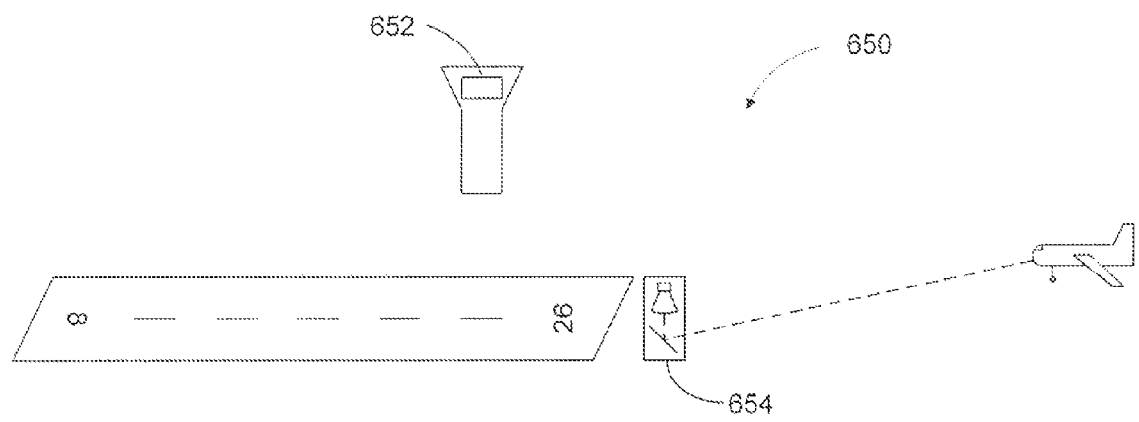
FIG. 6B illustrates a diagram of an exemplary radar detection system used in an instrument landing application in accordance with another embodiment of the invention.

FIG. 6B illustrates a diagram of an exemplary radar detection system 650 used in an instrument landing application in accordance with another embodiment of the invention. The radar detection system 650 may be used to track airplanes or other aircrafts on approach to a runway or airport. For example, a base unit 652 may be employed at a control tower and a radar sensor 654 may be positioned near a runway to track airplanes on approach to the runway. Other multitude of applications exist for the radar detection systems described herein.

Figure 7A:
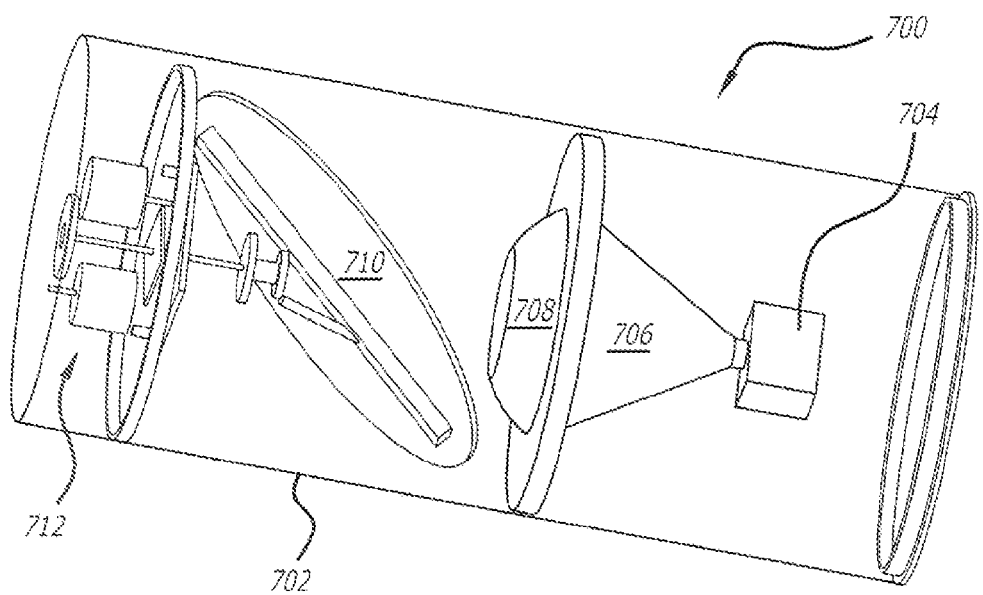
FIGS. 7A-E illustrate various views of an exemplary radar sensor in accordance with another embodiment of the invention.
Figure 7B:
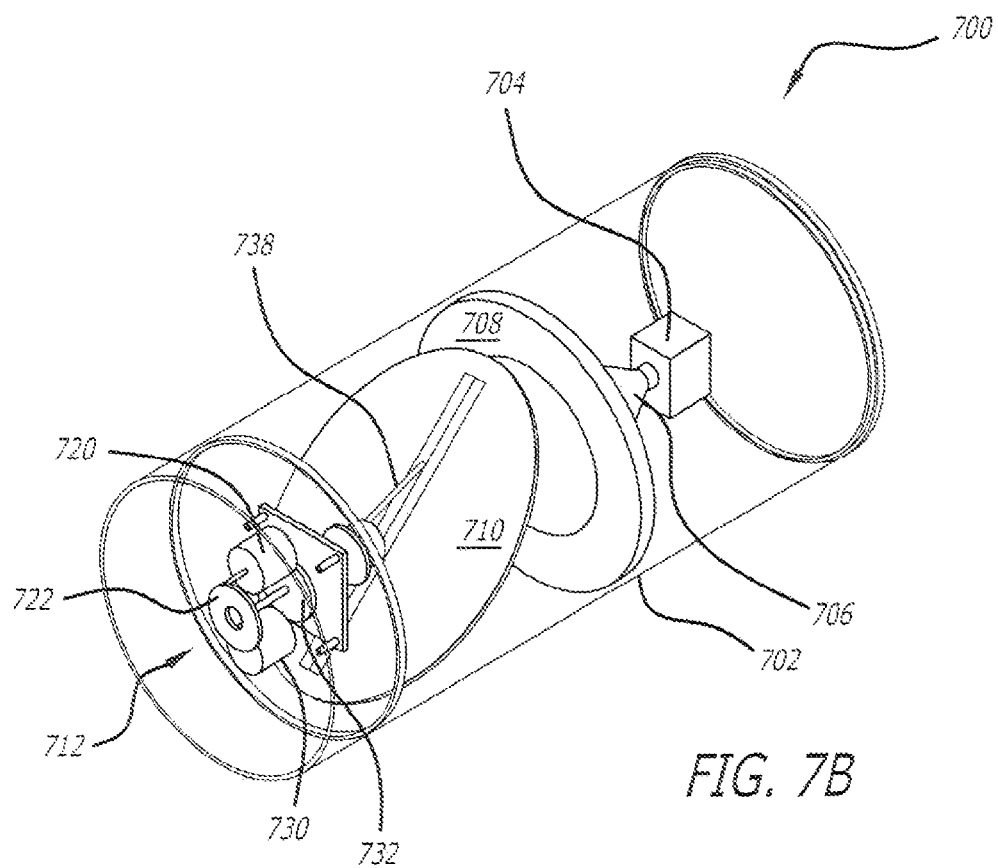
Figure 7C:
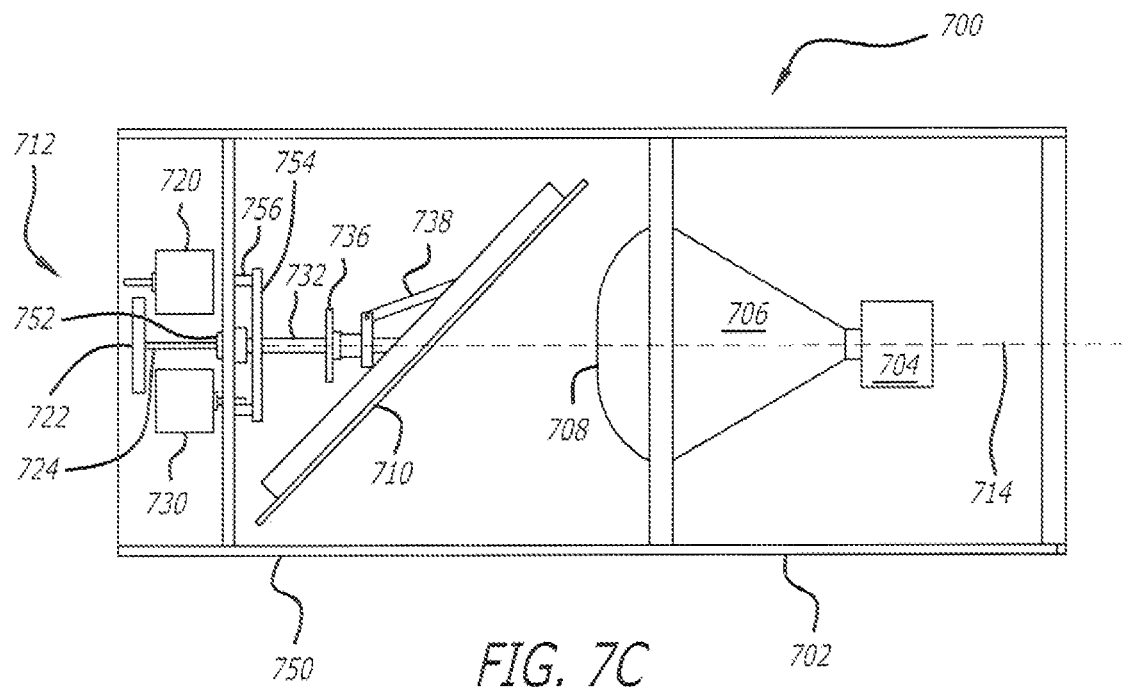
Figure 7D:
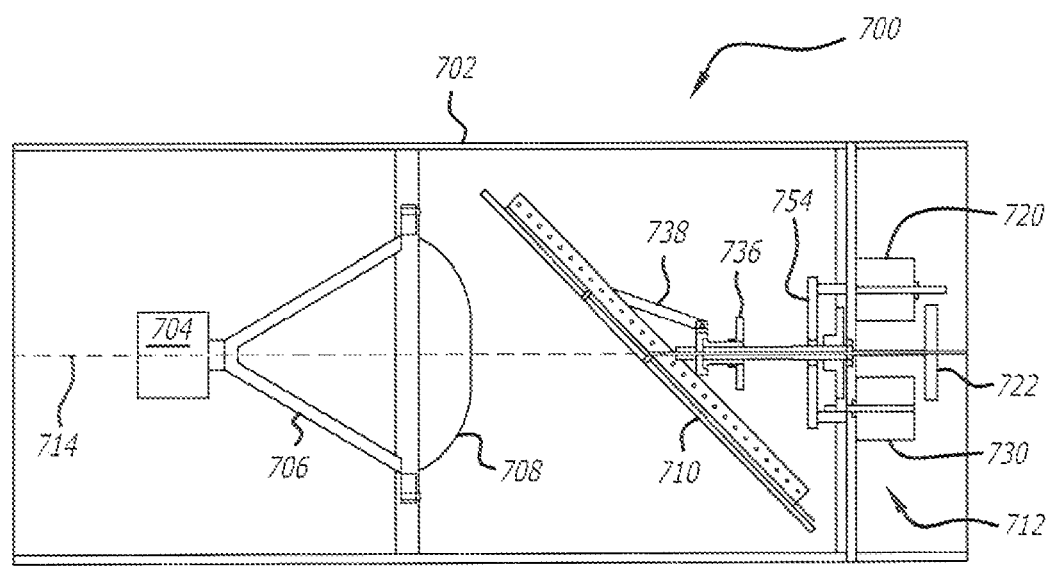
Figure 7E:
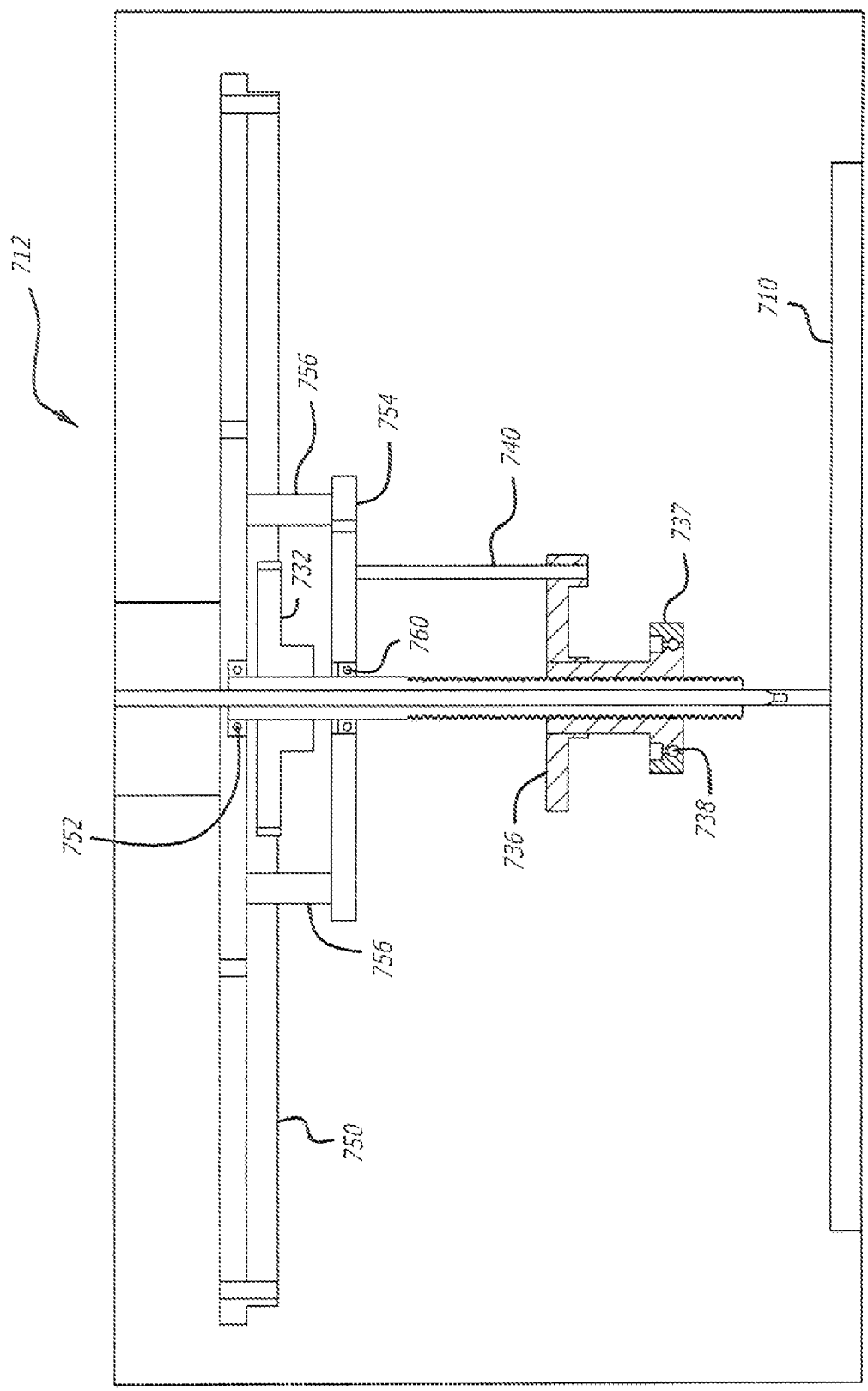

FIGS. 7A-E illustrate various views of an exemplary radar sensor 700 in accordance with another embodiment of the invention. The radar sensor 700 may be a particular implementation of any of the radar sensors previously discussed. Referring initially to FIG. 7A illustrating an internal perspective view, the radar sensor 700 comprises a cylindrical housing 702 which encloses a radar transceiver 704, a cone-shaped waveguide 706, a lens 708, a deflector 710, and a mechanism 712 for adjusting the azimuth and elevation orientation of the deflector 710. The deflector adjustment mechanism 712 causes the deflector 710 to rotate about a rotational axis 714 to change the azimuth orientation of the deflector 710 (see FIGS. 7C-D). The output/input of the transceiver 704, the central axis of the conical waveguide 706, and the focal axis of the lens 708 substantially coincide with the rotational axis 714 of the deflector 710.

As illustrated better in FIGS. 7B-7E, which show other various views of the radar sensor 700, the deflector adjustment mechanism 712 comprises a deflector azimuth motor 720 rotationally coupled to a gear 722 which, in turn, is rotationally coupled to an end of a drive shaft 724. The drive shaft 724 extends from the gear 722 towards the deflector 710 substantially coincident with the rotational axis 714 of the deflector 710. The other end of the drive shaft 724 is securely coupled to the deflector 710. Accordingly, as the deflector azimuth motor 720 is activated, the deflector 710 rotates in the azimuth direction about the rotational axis 714.

The deflector adjustment mechanism 712 further comprises a deflector elevation motor 730, a gear 732, a lead screw 734, a screw nut 736, a tilt arm 738, and a stabilizer rod 740. The deflector elevation motor 730 is rotationally coupled to the gear 732 which, in turn, is rotationally coupled to the lead screw 734. The screw nut 736 threads with the lead screw 734, and moves linearly substantially along the deflector rotational axis 714 with the rotation of the lead screw 734. The tilt arm 738 is pivotally attached at one end to a bearing collar 737. The bearing collar 737 is attached to a bearing 739 which is, in turn, attached to the screw nut 736 allowing rotation between the bearing collar 737 and the screw nut 736. The other end of the tilt arm 738 is pivotally attached to a location on the deflector 710 not coincident with the azimuth rotational axis 714 of the deflector 710. Accordingly, as the deflector elevation motor 730 is activated, the consequent rotation of the lead screw 734 transfer the rotational motion to linear motion of the screw nut 736. The tilt arm 738, being attached to the screw nut 736 through the bearing and bearing collar, either pushes or pulls the deflector 710, thereby tilting the deflector 710 in a way that will change the radar beam scan elevation (e.g., by a rotation of the deflector 710 about a tilt axis substantially perpendicular to the rotational axis 714 of the deflector 710).

The deflector mechanism 712 may be securely attached to a disc-shaped cross-member 750 which, in turn, is securely attached to the housing 702 of the radar sensor 700. The cross-member 750 includes a bearing 752 through which the lead screw 734 extends. The deflector mechanism 712 further includes a stabilizing cross-member 754 including a bearing through which the lead screw 734 also extends. The stabilizing cross-member 754 maintains the lead screw 734 stable along the rotational axis 714 of the deflector 710. The stabilizing cross-member 754 includes a bearing 760 through which the lead screw 734 extends. The stabilizing cross-member 754 is securely attached to the main cross-member 750 via a plurality of posts 756. The stabilizing cross-member 754 has an attached stabilizing rod 740 that extends substantially parallel, but off center, to the rotational axis 714. The stabilizing rod 740 is coupled to the screw nut 736 through a hole with a slightly larger diameter than the stabilizing rod 740 to allow the screw nut 736 to move vertically along the rotational axis 714 of the deflector 710 without rotating about the axis 714. The drive shaft 724 is situated within an elongated bore in the lead screw 734 that extends substantially along the rotational axis 714 of the deflector 710.

The above configuration of the deflector mechanism 712 is particularly suited for low power application if the deflector 710 and the mechanism 712 are constructed from light weight materials. The deflector mechanism 712 described herein is but one example of a mechanism to control the azimuth and elevation orientation of the deflector 710. There are many other manners of accomplishing this, even using other types of drive devices, such as electromagnetic devices that move linear (for deflector pivoting purposes) in response to a magnetic field, such as a voice coil.

Figure 8:
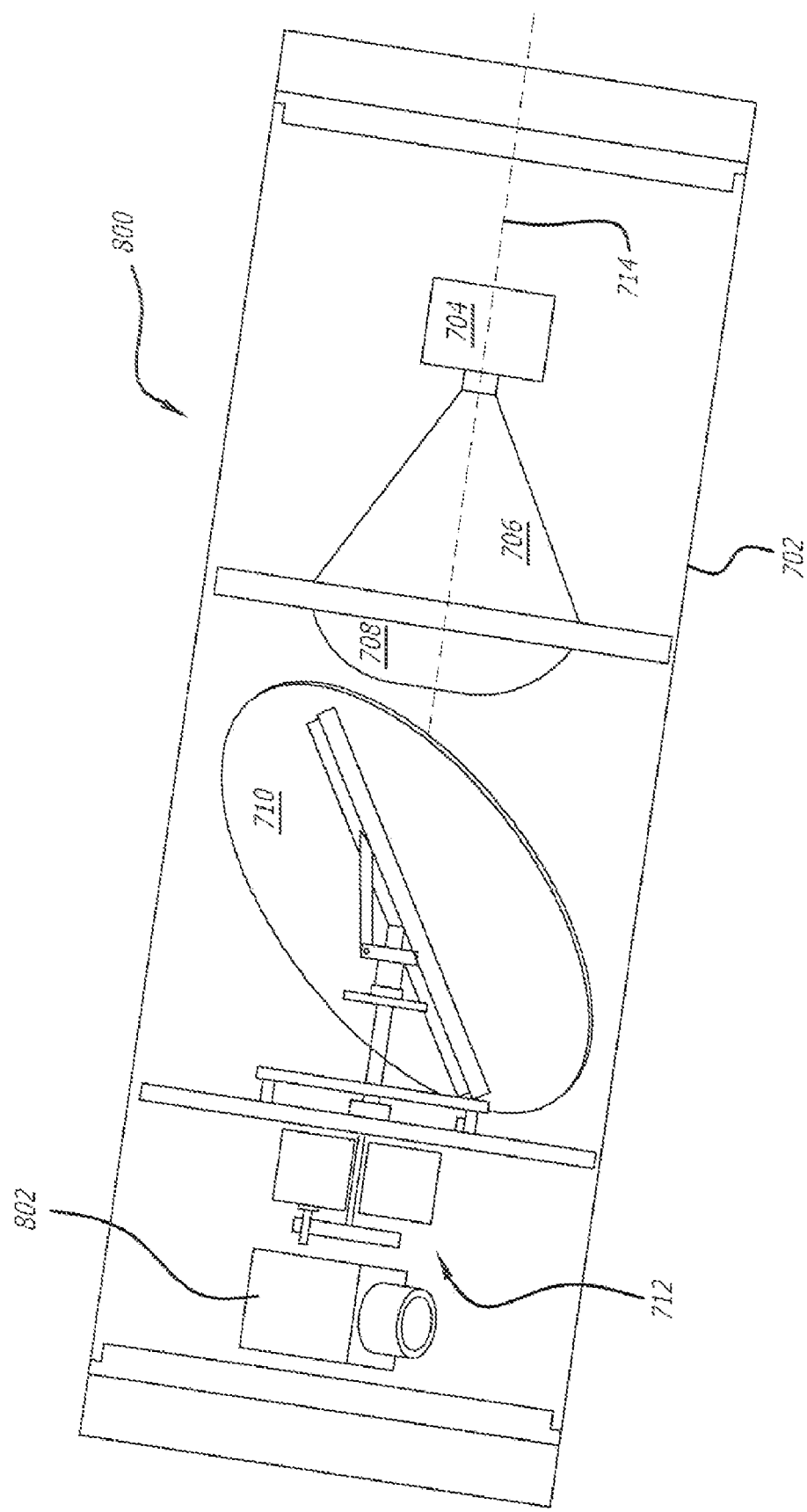
FIG. 8 illustrates a perspective view of another exemplary radar sensor in accordance with another embodiment of the invention.

FIGS. 8 illustrate various views of another exemplary radar sensor 800 in accordance with another embodiment of the invention. The radar sensor 800 is substantially the same as the radar sensor 700, except that it includes a camera 802. The camera 802 is rotatable substantially about the rotational axis 714 of the deflector 710. Although not shown, a camera azimuth motor may be included for rotating the camera 802 along the azimuth. Although not shown, there may be one or more electronic boards for housing the radar sensor processor, communication interface, and other electronics. It shall be understood that the electronic boards may be present in the embodiment described with reference to FIGS. 7A-E.

Figure 9A:
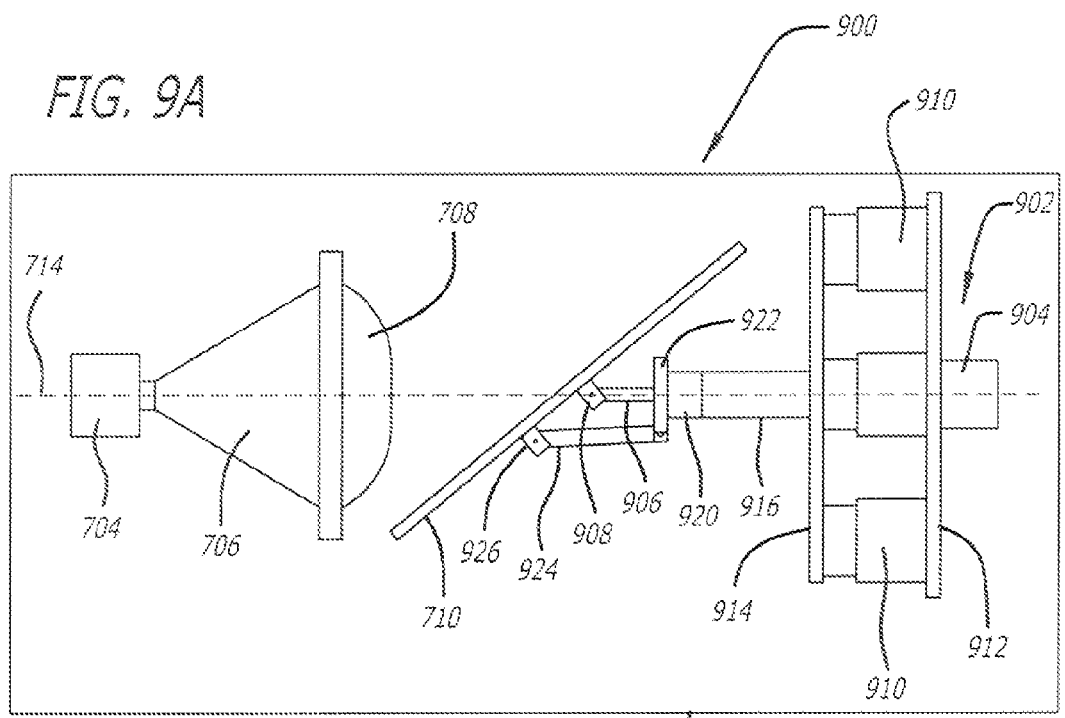
FIGS. 9A-B illustrate side and perspective view of still another exemplary radar sensor in accordance with another embodiment of the invention.
Figure 9B:
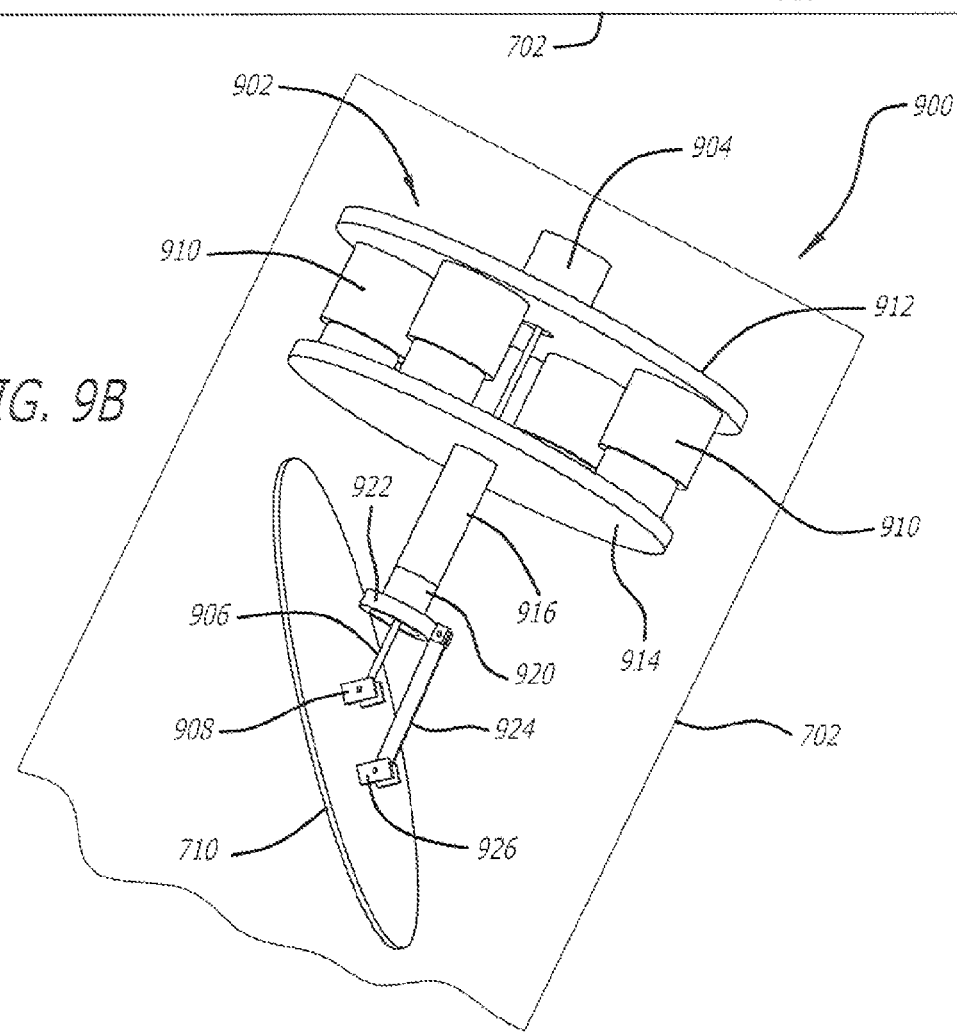

FIGS. 9A-B illustrate side and perspective view of still another exemplary radar sensor 900 in accordance with another embodiment of the invention. The radar sensor 900 is similar to the previous embodiments 700 and 800, in that it includes a radar transceiver 704, a cone-shaped waveguide 706, a lens 708, and a deflector 710 that is capable of rotating along azimuth and elevation directions. The radar sensor 900 differs from the previous embodiments in that it includes a different deflector mechanism 902.

More specifically, the deflector mechanism 902 comprises an azimuth motor 904 rotationally coupled to a drive shaft 906 which, in turn, is pivotally coupled to the deflector 710 by way of a flange member 908. The drive shaft 906 extends substantially along the rotational axis 714 of the deflector 710. Accordingly, when the azimuth motor 904 is activated, the drive shaft 906 rotates, thereby causing the deflector 710 to rotate about the axis 714. Thus, the azimuth orientation of the deflector 710 may be controlled or adjusted by proper activation of the azimuth motor 904.

The deflector mechanism 902 further comprises one or more linear elevation motors 910 (e.g., a voice coil) situated between and attached to a mounting plate 912 and a push/pull plate 914. The deflector mechanism 902 further comprises an elongated bore 916 extending substantially along the rotational axis 714 from the push/pull plate 914 to a bearing 920 including a collar 922. The deflector mechanism 902 further includes an arm 924 pivotally coupled to the bearing collar 922 and to the deflector 710 via another flange member 926. The azimuth motor 904 may be mounted on the mounting plate 912. The drive shaft 902 extends from the azimuth motor 904 to the deflector 710 by way of respective openings through the mounting and push/pull plates, and through respective channels in the elongated bore 916 and bearing 920.

In operation, when the one or more linear elevation motors 910 are activated, the linear motor(s) 910 push or pull the push/pull plate 914. This causes the elongated bore 916 and bearing 920 to move towards or away from the deflector 710 along the rotational axis 714. This, in turn, causes the arm to either push against the deflector 710 to tilt the deflector in a particular direction or pull the deflector 710 to tilt the deflector in the opposite direction. Thus, the elevation orientation of the deflector 710 may be controlled or adjusted by proper activation of the one or more linear motors 910.

The radar sensors 700, 800 and 900 described herein allow the deflector 710 to rotate and pivot, while keeping the radar transceiver 704 stationary. This has several advantages. First, the radar sensors consume less power since only the deflector 710 needs to be rotated, and not the radar transceiver 704. Second, there is no need for slip-rings or other electrical connections through the axis of rotation, which would otherwise be required if the radar transceiver 704 was rotating. Third, because the deflector 710 and its few connected components may be constructed from light weight materials, and because they are the only moving components that perform beam steering, the deflector 710 may rotate with much more agility while requiring much less energy. The deflector mechanism enables the radar sensor to perform a continuous 360 degree azimuth scanning while simultaneously and rapidly steering the radar beam in elevation.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A base unit for communication with a radar sensor, comprising:
   a user input device;
   a communication interface; and
   a processor adapted to:
      accept user input from the user input device, wherein the user input includes a scan profile command indicating how the radar sensor is to scan along an azimuth and an elevation;
      transmit the scan profile command to the radar sensor by way of the communication interface; and
      receive radar return information from the radar sensor by way of the communication interface, wherein said processor is adapted to receive an image signal of surroundings of the radar sensor; and
   a display;
   wherein the processor causes the image of the radar sensor surroundings to be displayed on the display; wherein the processor is adapted to superimpose on the image one or more lines indicating the scan profile of the radar sensor with respect to the surroundings of the radar sensor; and wherein the user input device allows a user to graphically change the one or more scan profile lines superimposed on the radar sensor surroundings image displayed on the display, and in response, the processor is adapted to transmit a new scan profile command to the radar sensor by way of the communication interface that reflects the change in the scan profile for the radar sensor.

2. The base unit of claim 1, wherein the scan profile command indicates that the radar sensor is to perform a plurality of continuous 360 degree scans along the azimuth.

3. The base unit of claim 2, wherein the scan profile command indicates that the radar sensor is to vary the scan elevation in a predetermined pattern or in an ad-hoc tracking manner.

4. The base unit of claim 1, wherein the processor is further adapted to receive a camera image signal of an object-of-interest from the radar sensor by way of the communication interface, and causes the camera image of the object-of-interest to be displayed on the display.

5. The base unit of claim 4, wherein the processor is adapted to cause the display to display tracking information of the object-of-interest.

6. The base unit of claim 1, wherein the processor is adapted to cause the display to display one or more soft control buttons for controlling the radar sensor.

7. A radar system, comprising:
   a base unit, comprising:
      a user input device;
      a base unit communication interface; and
      a base unit processor adapted to:
         receive a scan profile command from the user input device, wherein the scan profile command indicates how a radar sensor is to scan along an azimuth and an elevation;
         transmit the scan profile command by way of the communication interface; and
         receive radar return information by way of the base unit communication interface; and
   a radar sensor, comprising:

a radar sensor communication interface;
a radar transceiver for generating an incident radar signal and receiving a return radar signal;
a deflector for directing the incident radar signal along a scanning direction, and directing the return radar signal received from the scanning direction to the radar transceiver;
a deflector mechanism adapted to independently rotate the deflector about an azimuth axis and rotate the deflector about an elevation axis to independently change the azimuth and elevation components of the scanning direction;
a radar sensor processor adapted to:
receive the scan profile command from the base unit by way of the radar sensor communication interface;
control the deflector mechanism in accordance with the scan profile command; and
transmit radar return information to the base unit by way of the radar sensor communication interface;
a camera; and
a camera view mechanism adapted to rotate a view of the camera about the azimuth axis;
wherein the radar sensor processor is adapted to:
control the camera view mechanism to cause the view of the camera to rotate about the azimuth axis;
receive a camera image signal from the camera while the view of the camera is rotated about the azimuth axis, wherein the camera image signal relates to an image of surroundings of the radar sensor; and
transmit the camera image signal to the base unit by way of the radar sensor communication interface;
wherein the base unit further comprises a display, and wherein the base unit processor is adapted to:
receive the camera image signal from the radar sensor by way of the base unit communication interface; and
cause the camera image of the surroundings of the radar sensor to be displayed on the display;
wherein the base unit processor is adapted to superimpose on the radar sensor surroundings image, one or more lines indicating the scan profile of the radar sensor with respect to the radar sensor surroundings; and
wherein the user input device allows a user to graphically change the one or more scan profile lines superimposed on the surroundings image displayed on the display; and in response, the base unit processor is adapted to transmit a new scan profile command to the radar sensor by way of the base unit communication interface that reflects the change in the scan profile for the radar sensor.

8. The radar system of claim 7, wherein the radar sensor processor controls the deflector mechanism to rotate the deflector 360 degree continuously about the azimuth axis in accordance with the scan profile command.

9. The radar system of claim 7, wherein the radar sensor processor controls the deflector mechanism to rotate the deflector about the elevation axis in a specified manner as the deflector is simultaneously controlled for rotation about the azimuth axis.

10. The radar system of claim 7, wherein the radar sensor processor adapted to:
receive the new scan profile command from the base unit by way of the radar sensor communication interface; and
control the deflector mechanism in accordance with the new scan profile command.

11. A radar system, comprising:
a base unit, comprising:
a user input device;
a base unit communication interface; and
a base unit processor adapted to:
receive a scan profile command from the user input device, wherein the scan profile command indicates how a radar sensor is to scan along an azimuth and an elevation;
transmit the scan profile command by way of the communication interface; and
receive radar return information by way of the base unit communication interface; and
a radar sensor, comprising:
a radar sensor communication interface;
a radar transceiver for generating an incident radar signal and receiving a return radar signal;
a deflector for directing the incident radar signal along a scanning direction, and directing the return radar signal received from the scanning direction to the radar transceiver;
a deflector mechanism adapted to independently rotate the deflector about an azimuth axis and rotate the deflector about an elevation axis to independently change the azimuth and elevation components of the scanning direction;
a radar sensor processor adapted to:
receive the scan profile command from the base unit by way of the radar sensor communication interface;
control the deflector mechanism in accordance with the scan profile command; and
transmit radar return information to the base unit by way of the radar sensor communication interface;
a camera; and
a camera view mechanism adapted to rotate a view of the camera about the azimuth axis;
wherein the base unit processor is adapted to:
receive a camera view command from the user input device; and
transmit the camera view command to the radar sensor by way of the base unit communication interface; and
wherein the radar sensor processor is adapted to:
receive the camera view command from the base unit by way of the radar sensor communication interface; and
control the camera view mechanism to cause the view of the camera to rotate about the azimuth axis in accordance with the camera view command.

12. The radar system of claim 11, wherein the radar sensor processor is adapted to:
receive an image signal of an object-of-interest from the camera; and
transmit the image signal of the object-of-interest to the base unit by way of the radar sensor communication interface; and
wherein the base unit processor is adapted to:
receive the image signal of the object-of-interest from the radar sensor by way of the base unit communication interface; and
cause the image of the object-of-interest to be displayed on a display.

* * * * *